United States Patent
Li et al.

(10) Patent No.: US 12,063,171 B2
(45) Date of Patent: Aug. 13, 2024

(54) SMALL GAP DURING UPLINK SWITCH IN MULTI-TRP

(71) Applicant: Apple Inc., Cupertino, CA (US)

(72) Inventors: Qiming Li, Beijing (CN); Dawei Zhang, Saratoga, CA (US); Huaning Niu, San Jose, CA (US); Jie Cui, San Jose, CA (US); Manasa Raghavan, Sunnyvale, CA (US); Xiang Chen, Campbell, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,399

(22) PCT Filed: Jan. 15, 2021

(86) PCT No.: PCT/CN2021/071989
§ 371 (c)(1),
(2) Date: Sep. 21, 2021

(87) PCT Pub. No.: WO2022/151302
PCT Pub. Date: Jul. 21, 2022

(65) Prior Publication Data
US 2023/0361946 A1    Nov. 9, 2023

(51) Int. Cl.
*H04L 5/00* (2006.01)
*H04B 7/024* (2017.01)
(Continued)

(52) U.S. Cl.
CPC ......... *H04L 5/0035* (2013.01); *H04W 52/367* (2013.01)

(58) Field of Classification Search
None
See application file for complete search history.

(56) References Cited

U.S. PATENT DOCUMENTS

| 10,368,350 B2 | 7/2019 | Majmundar et al. |
| 2018/0124673 A1 | 5/2018 | Tenny et al. |
| (Continued) | | |

FOREIGN PATENT DOCUMENTS

| CN | 111466129 A | 7/2020 |
| WO | WO-2020-194103 A1 | 10/2020 |

OTHER PUBLICATIONS

Notification of Transmittal of the International Search Report and the Written Opinion of the International Searching Authority, for PCT Appl. No. PCT/CN2021/071989, 9 pages, dated Sep. 3, 2021.

*Primary Examiner* — Scott M Sciacca
(74) *Attorney, Agent, or Firm* — Sterne, Kessler, Goldstein & Fox P.L.L.C.

(57) ABSTRACT

Apparatuses, systems, and methods for providing downlink control for multi-TRP transmission. A wireless device, comprising: at least one antenna; at least one radio coupled to the at least one antenna; and a processor coupled to the at least one radio and configured to cause the wireless device to: determine a gap period is to be applied between a first uplink transmission to a cellular base station via a first transmission reception point (TRP) and a second uplink transmission to the cellular base station via a second TRP; and perform the first and second uplink transmissions consecutively with the gap period applied between them.

20 Claims, 10 Drawing Sheets

(51) Int. Cl.
   *H04W 52/04*      (2009.01)
   *H04W 52/36*      (2009.01)

(56) References Cited

U.S. PATENT DOCUMENTS

| | | | | |
|---|---|---|---|---|
| 2018/0367185 A1* | 12/2018 | Yi | ................. | H04B 1/7143 |
| 2023/0124582 A1* | 4/2023 | Frenne | ................. | H04L 5/0012 |
| | | | | 370/329 |
| 2023/0389007 A1* | 11/2023 | Deghel | ................. | H04B 7/0696 |

* cited by examiner

SMALL GAP DURING UPLINK SWITCH IN MULTI-TRP

CROSS-REFERENCE TO RELATED APPLICATION

This application is a U.S. National Phase of International Application No. PCT/CN2021/071989, filed Jan. 15, 2021, which is hereby incorporated by reference in its entirety.

FIELD

The present application relates to wireless devices, and more particularly to apparatus, systems, and methods for enabling small gap during uplink switch in multi-TRP.

DESCRIPTION OF THE RELATED ART

The ever increasing number of features and functionality introduced in wireless communication devices also creates a continuous need for improvement in both wireless communications and in wireless communication devices. To increase coverage and better serve the increasing demand and range of envisioned uses of wireless communication, there are further wireless communication technologies under development, including fifth generation (5G) new radio (NR) communication.

Moreover, joint transmission/reception by multiple transmission and reception points (multi-TRP) is an important technology in wireless communication, and it is sometimes referred to as Coordinated Multiple Points (CoMP) transmission or multipoint transmission for short. CoMP transmission can be used to transmit the same transmission block or signaling information through different channel characteristics to multiple nodes of the wireless communication network, so as to obtain diversity gain and improve robustness of the system. Because of its benefit, CoMP transmission continues to be used in 5G NR communication.

The 3rd Generation Partnership Project (3GPP) is now discussing on supporting physical uplink control channel (PUCCH)/physical uplink shared channel (PUSCH) transmission with repetition to multiple TPRs in Release 17 FeMIMO design of 5G NR.

SUMMARY

Embodiments relate to apparatuses, systems, and methods to provide downlink control for multi-TRP transmission.

According to the techniques described herein, small gap is applied between uplink transmissions to different TRPs in predetermined condition. The wireless device and the cellular base station may determine whether a gap period is to be applied between a first uplink transmission to a first TRP and a second uplink transmission to a second TRP, and if the determination is positive, the wireless device may perform the first and second uplink transmissions consecutively with the gap period applied therebetween, and the cellular base station may received the uplinks transmissions via the respective TRPs.

By means of the gap period, the wireless device may be able to make preparations for the uplink transmission to a different TRP, for example, to get a transmit power, a transmit beam and a transmit timing ready for the subsequent transmission. As a result, improvements in performance and efficiency of the uplink transmissions, such as PUSCH or PUCCH transmissions, can be expected.

Thus, the techniques described herein may be used to enable small gap during uplink transmissions to multiple TRPs, at least according to some embodiments.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
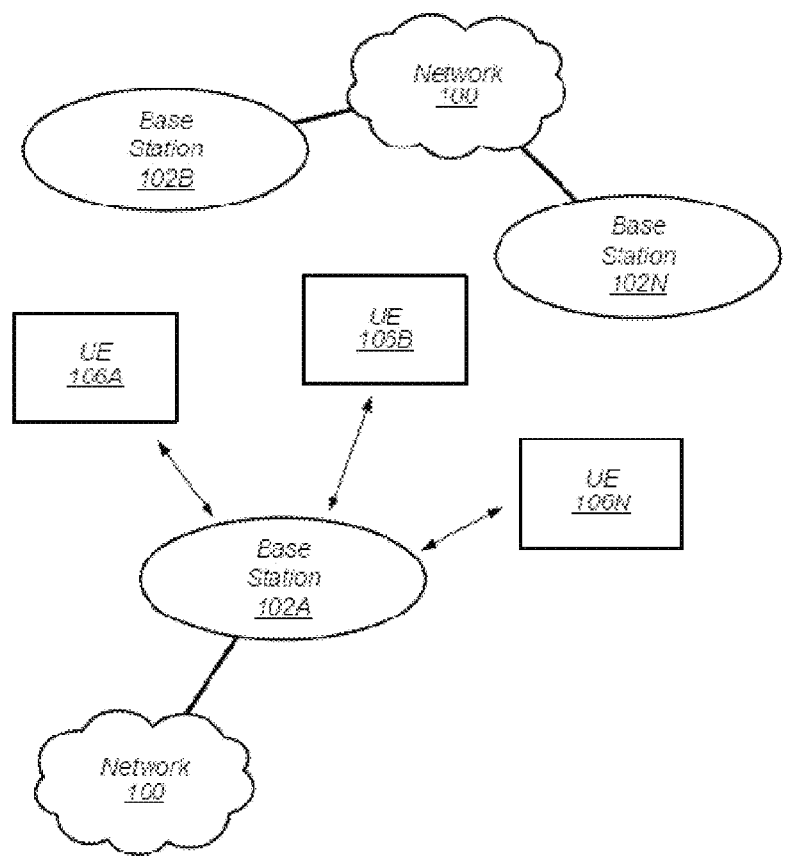
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™ iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Overview of Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Figure 2:
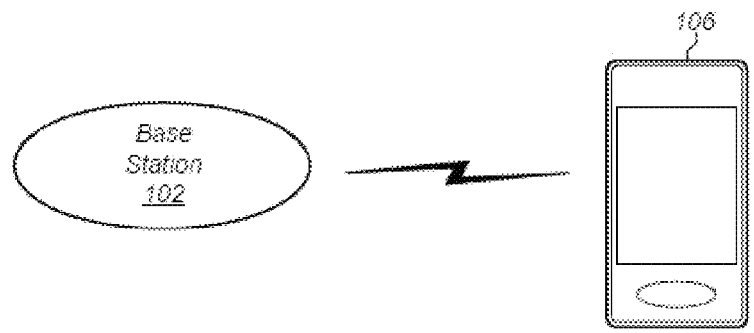
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
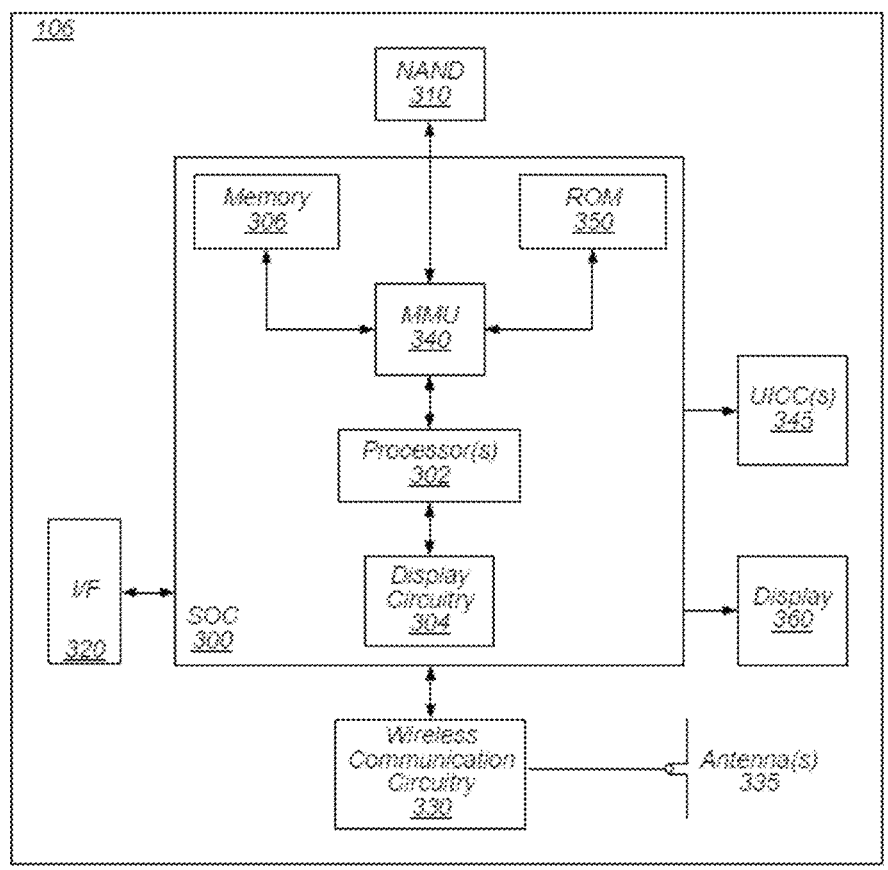
FIG. 3 illustrates an example block diagram of a UE, according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
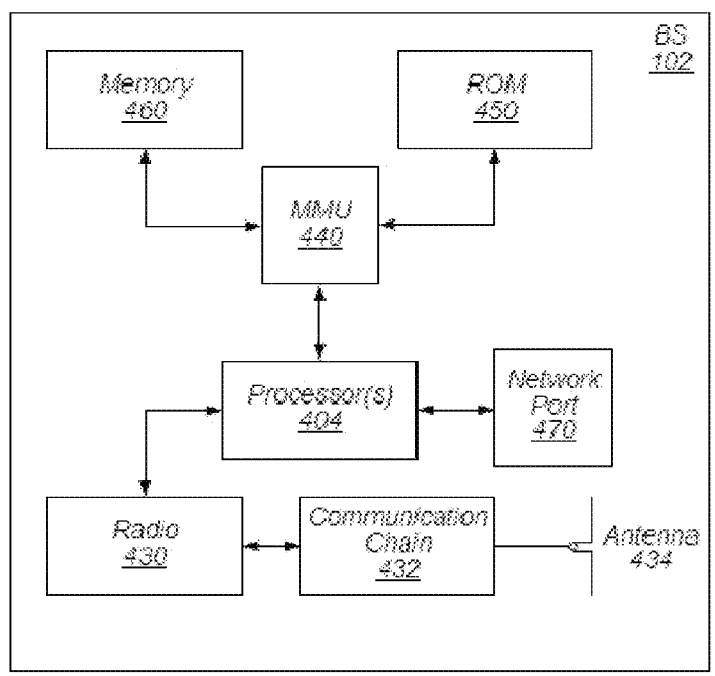
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
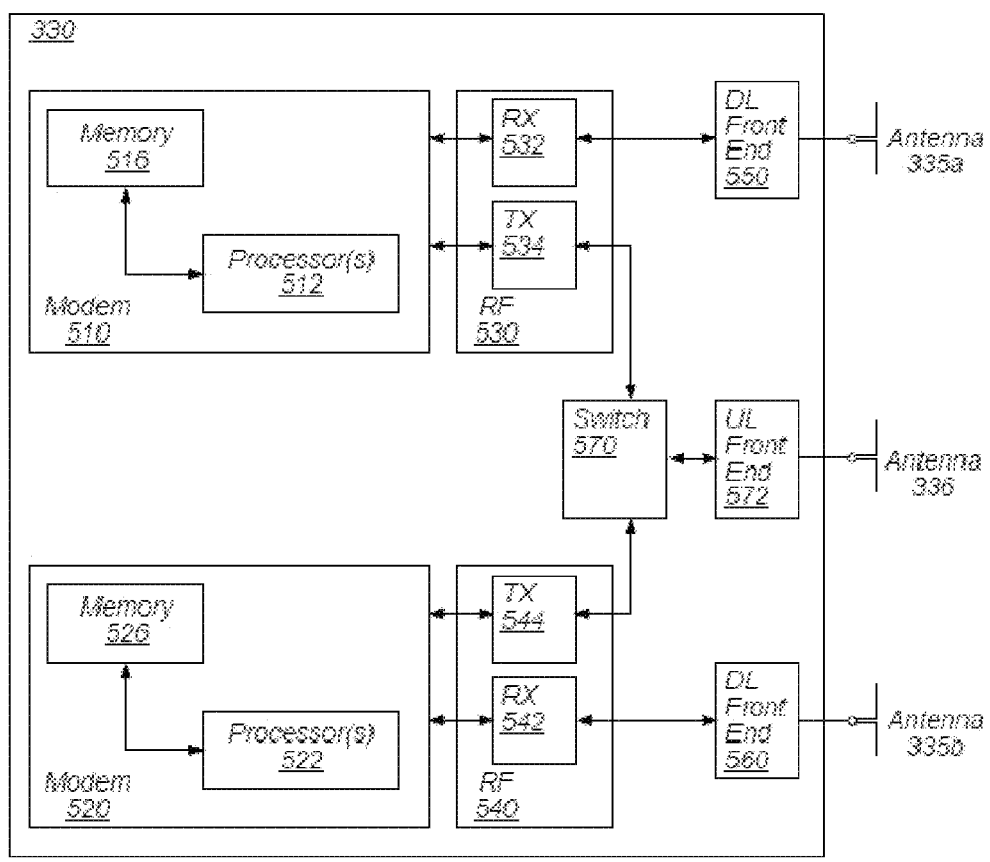
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Uplink Transmission to Multiple TRPs

New cellular communication techniques are continually under development, to increase coverage, to better serve the range of demands and use cases, and for a variety of other reasons. One technique that is currently under development may include supporting PUCCH/PUSCH transmission with repetition to multiple TPRs, in which UE can transmit uplink data or control information to the base station via multiple TRPs.

Figure 6:
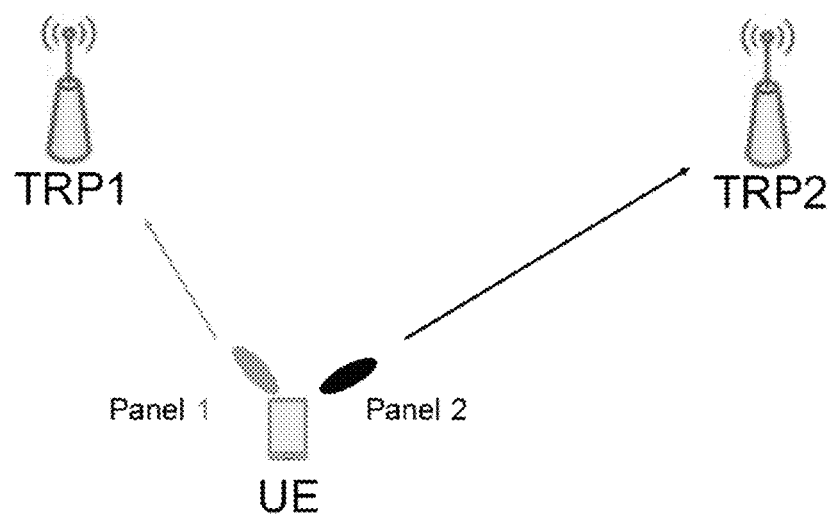
FIG. 6 illustrates an example scenario of the multi-TRP uplink transmission, according to some embodiments.

FIG. 6 illustrates an example scenario of the multi-TRP uplink transmission, according to some embodiments, in which two TRPs are shown for purpose of explanation, but the number of TRPs is not limited particularly. As shown in FIG. 6, the UE is scheduled to perform PUSCH or PUCCH transmissions for the same user data or control information to TRP 1 and TRP 2 which are geographically separated and connected to the same base station.

The process of uplink transmission is briefly introduced here by taking PUSCH transmission for example. The user data from the Medium Access Control (MAC) layer will be processed as a "transport block (TB)", which needs to go through a series of uplink physical layer processing in order to be mapped to the transmission channel in the physical layer. Uplink physical layer processing generally includes: cyclic redundancy check (CRC) addition to the transport block; code block segmentation and code block CRC addition; channel coding; physical layer HARQ processing; rate matching; scrambling; modulation; layer mapping, transform precoding and precoding; mapping to allocated resources and antenna ports, and so on.

Through various signal processing functions of the physical layer, the bit stream as user data is encoded and modulated into OFDM symbols, and is transmitted to the serving base station by respective antenna array/panel using allocated time-frequency resources. The base station receiving the signal receives and decodes the user data through an inverse process of the above-mentioned signal processing.

Figure 7:
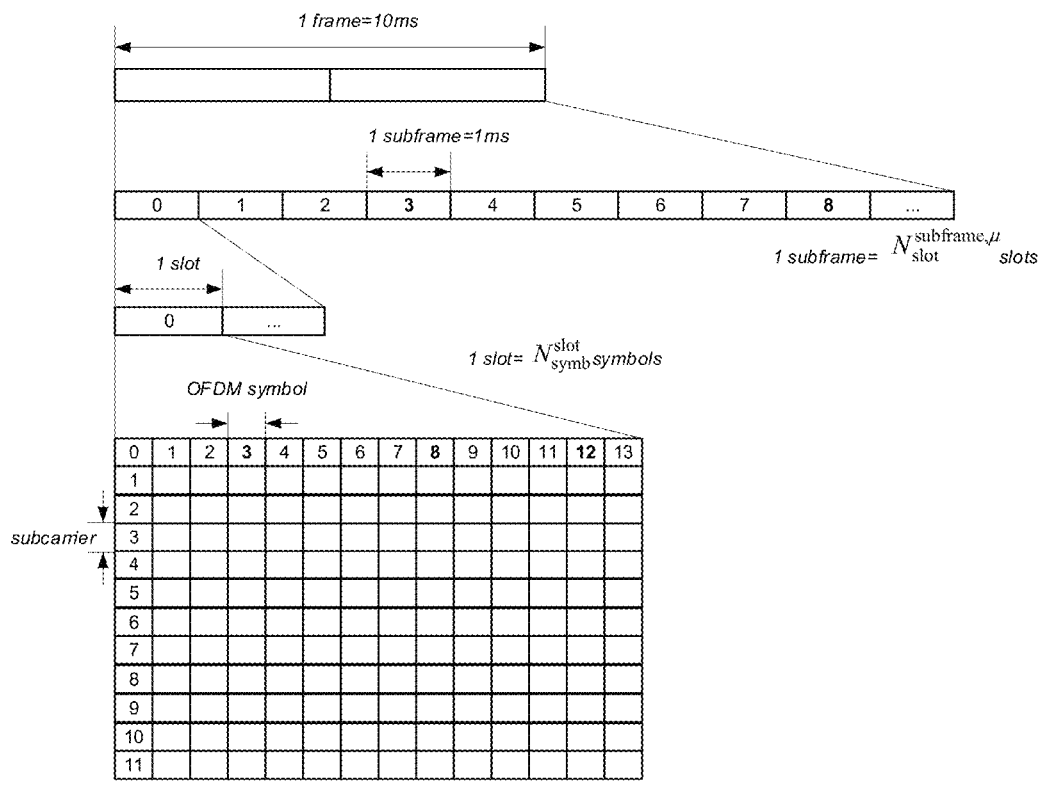
FIG. 7 shows a diagram of a frame structure in 5G NR.

In 5G NR, both of downlink and uplink transmissions are organized into frames. FIG. 7 shows a diagram of a frame structure in 5G NR. As a fixed frame compatible with LTE/LTE-A, the frame in NR also has a length of 10 ms and includes 10 subframes of equal size, each of which has a length of 1 ms. Unlike LTE/LTE-A, the frame structure in NR has a flexible structure that depends on supported transmission numerologies as shown in the following Tables 1-3.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

TABLE 2

Number of OFDM symbols per slot, slots per frame, and slots per subframe for normal cyclic prefix.

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

Number of OFDM symbols per slot, slots per frame, and slots per subframe for extended cyclic prefix.

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

Each subframe has a configurable number $N_{slot}^{subframe,\mu}$ of time slots, such as 1, 2, 4, 8 or 16. Each slot also has a configurable number $N_{symb}^{slot}$ of OFDM symbols. For a normal cyclic prefix, each slot includes 14 consecutive OFDM symbols, and for an extended cyclic prefix, each slot includes 12 consecutive OFDM symbols. In the frequency domain dimension, each time slot includes several resource blocks, and each resource block includes 12 consecutive subcarriers in the frequency domain. Thus, a resource grid can be used to represent resource elements (RE) in a time slot, as shown in FIG. 7. The resource blocks available for uplink transmission can be divided into data sections and control sections. The resource elements in the control sections can be allocated to the UE for transmission of control information. The data sections may include all resource elements that are not included in the control sections. The UE may also be allocated resource elements in the data sections for transmitting data to the base station.

When having data to be transmitted, the UE can send a scheduling request (SR) and/or a buffer status report (BSR) to the base station to request time-frequency resources for transmitting user data. In a resource scheduling based on dynamic grant, the base station can use DCI containing resource allocation information to dynamically schedule the PUSCH. In a resource scheduling based on configured grant, the base station can pre-configure available time-frequency resources for the UE through RRC layer signaling, so that UE can directly use the pre-configured time-frequency resources for PUSCH transmission without requesting the base station to send uplink grant each time.

To guarantee the reliability of transmission for example in poor channel conditions, UE may perform the uplink transmissions with repetitions, where the number of repetitions may be configured by BS. For example, in the case of configured grant as described above, a parameter repK in the RRC layer signaling ConguredGrantConfig is configured to for example 1, 2, 4 or 8, and the UE can repeat the same transmission on the corresponding number of consecutive transmission occasions.

Although the PUSCH transmission is described above, the uplink transmission is not limited thereto according to some embodiments. PUCCH transmission with repetition may also be performed on a configured number of consecutive transmission occasions corresponding to the allocated PUCCH resources, and the detailed description thereof is omitted here.

Figure 8:
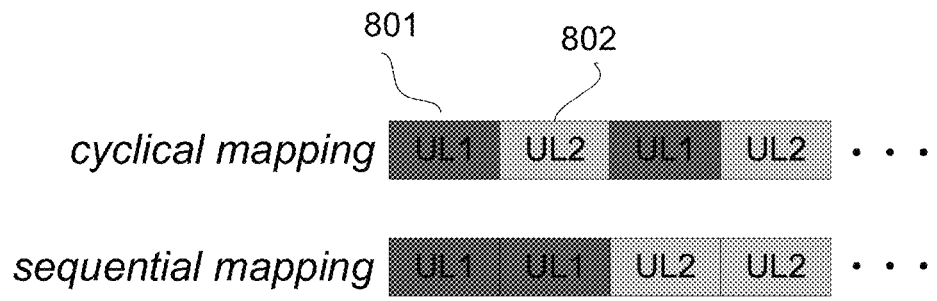
FIG. 8 illustrates two example repletion mappings to be supported in relation to the scenario of FIG. 6.

FIG. 8 illustrates two example repletion mappings to be supported in relation to the scenario of FIG. 6, namely, cyclical mapping and sequential mapping. For example, in case of the cyclical mapping, the UE performs the uplink transmission to TRP1 (blocks 801 denoted by "UL1") and the uplink transmission to TRP2 (blocks 802 denoted by "UL1") cyclically, and in case of the sequential mapping, the UE performs all of the uplink transmissions 801 to TRP1, and then performs all of the uplink transmissions 802 to TRP2. The type of mapping may be configured by the base station. However, whatever mapping is used, the UE may encounter a change in transmit parameters when the uplink transmission is transitioned to a different TRP.

For example, TRP1 and TRP2 may have different distances from the UE and/or may be subject to different channel environments, resulting in different pathlosses between the UE and respective TRPs. In order to guarantee the uplink performance, the UE may need to transmit with different powers to TRP1 and TRP2.

Besides, the UE may transmit radio signals by beamforming to form beams with high directivity, specifically in high frequency band, e.g. in FR2. Thus, different uplink transmit beams may be assumed for TRP1 and TRP2, and the UE may need to switch the uplink beam for transmission to a different TRP, even may need to switch the antenna panel for forming the uplink beam. For example, as illustrated in FIG. 6, the UE may use Panel 1 to form an uplink beam directed to TRP1, and when it is turn to perform the uplink transmission to TRP2, the UE may need to switch from Panel 1 to Panel 2 to form an uplink beam directed to TRP2.

Furthermore, the UE may even need to update the uplink timing if different timing references and/or timing advances are configured for the uplink transmissions to TRP1 and TRP2, especially when the TRPs may be located at different distances from the UE and thus have different propagation delays from them to the UE.

The UE needs time to finish all above procedures before it can transmit to a different TRP, among others. In the example of FIG. 6, after the uplink transmission to TRP1 is completed, the UE may need to adjust its transmit power, transmit beam and uplink timing, etc. to prepare for the uplink transmission to TRP2. These procedures take a period of time. However, in conventional multi-TRP PUSCH/PUCCH transmission, the transmissions with repetition are scheduled continuously, and there is not a specific time period designed for the transmit preparations. As a result, the uplink performance cannot be guaranteed for the succeeding transmission within this time period, since the transmit parameters have not been optimized.

Figure 9:
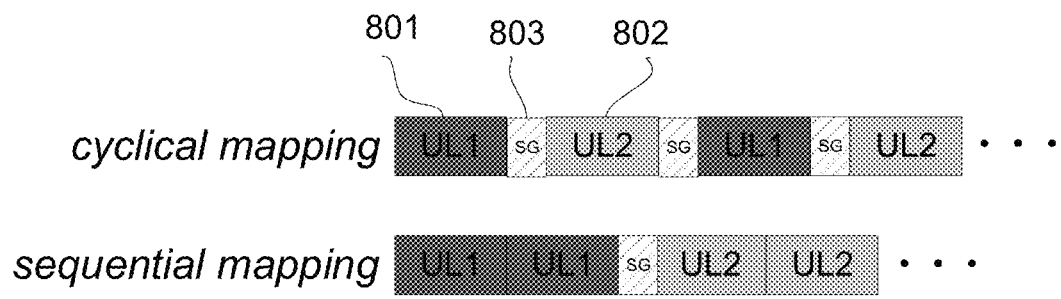
FIG. 9 illustrates an exemplary gap period applied in relation to the example of FIG. 8.

In view of this, the embodiments of the present application propose to enable a controlled small gap (hereinafter referred to as "gap period") between the uplink transmission occasions for different TRPs. FIG. 9 illustrates an exemplary gap period applied in relation to the example of FIG. 8, according to some embodiments. As shown in FIG. 9, in case of the cyclical mapping, a gap period (blocks 803 denoted by "SG") is applied between the uplink transmission occasion 801 for TRP1 (UL1) and the uplink transmission occasion 802 for TRP2 (UL2), and similarly, a gap period (SG) 803 is applied between the uplink transmission occasion 802 for TRP2 (UL2) and the uplink transmission occasion 801 for TRP1 (UL1). In case of the sequential mapping, a gap period (SG) 803 is applied only during a transition from the uplink transmission occasion 801 for TRP1 (UL1) to the uplink transmission occasion 802 for TRP2 (UL2), while no gap period is applied between uplink transmission occasions for the same TRP1 or TRP2, such as within two consecutive uplink transmission occasions 801 or two consecutive uplink transmission occasions 802.

In the present application, the gap period is utilized for the UE to make various transmit preparations for succeeding uplink transmission to a different TRP than the preceding uplink transmission, such that it is optimized to the configured transmit parameters. Three transmit preparations, namely, transmit power adjustment, transmit beam switching and uplink timing update, are mainly described below but they are not limited thereto.

For example, during a gap period 803 between the preceding uplink transmission occasion 801 for TRP1 and the succeeding uplink transmission occasion 802 for TRP2, the UE may adjust its transmit power according to the power control parameter configured for UL2, if the transmit power for UL2 is different from the transmit power for UL1.

Besides, the UE may switch its transmit beam according to beam indication configured for UL2 802, if the transmit beam for UL2 802 is different from the transmit beam for UL1 801. The transmit beam for UL1 and the transmit beam for UL2 may be formed by the same antenna panel, in which case the beam switching may involve a change in beamforming parameters of antennal elements, including amplitude parameters and phase parameters. Alternatively, the transmit beam for UL1 and the transmit beam for UL2 may be formed by different antenna panels, in which case the beam switching may involve, in addition to a change in beamforming parameters, a deactivation of the panel that is used previously to form the transmit beam for UL1 for energy saving and an activation of the panel that is to be used to form the transmit beam for UL2.

Furthermore, the UE may update the uplink timing according to timing reference and/or timing advance configured for UL2 802, such that an uplink synchronization is achieved with TRP2.

It should be noted that the UE may make various necessary transmit preparations during the gap period, including but not limited to the above-mentioned procedures. With the gap period, the UE may be ready to perform PUSCH or PUCCH transmission to a different TRP.

However, the gap period is not always necessary. For instance, when the UE is located at the middle of TRP1 and TRP2 and operating in FR1 (i.e. sub-6 GHz), the propagation delay difference is small, the expected uplink transmit power to the two TRPs are quite close, and thus the UE may only need a very short time period to finalize the power adjustment (or even apply the same transmit power). If the time taken for the power adjustment is shorter than CP length, then it will not impact the uplink performance. Same story for uplink timing adjustment, i.e., if the two TRPs are in the same TAG (timing advance group) or the same timing advance is indicated for them, then no timing adjustment is needed. Since it is operating in FR1, the UE may use an omni-directional beam or a wide beam, and the beam switching is not expected. In this instance, the UE may get it ready for the subsequent uplink transmission in a short time, and no extra gap period is required.

In the present application, the UE and the base station may test applicability of the gap period in accordance with a predetermined criterion. According to some embodiments, the gap period is determined to be applied between transmissions to different TRPs unless all of the following conditions are met:

1) the transmit power of the uplink transmission to TRP1 and the transmit power of the uplink transmission to TRP2 are the same, or a difference between them (power imbalance) is less than a certain threshold, e.g. 3 dBm, 6 dBm or the like;

2) the uplink transmit timing of the uplink transmission to TRP1 and the uplink transmit timing of the uplink transmission to TRP2 are the same, for example, when a uniform frame timing is used for TRP1 and TRP2; and 3) no beam switching is expected, for example, in a case where the UE is operating in FR1, or in a case where the UE is operating in FR2 but the TRPs are co-located, then the UE can use the same transmit beam to perform the uplink transmissions to different TRPs.

The determination of applicability of the gap period may be made on both of the UE side and the base station side, such that they have the same knowledge about whether the gap period is to be applied or not. However, in alternative embodiments, the determination of applicability of the gap period may be made explicitly on only the UE side, and the result of determination may be signaled to the based station, in which the reception of the determination result by the based station may be regarded as an implicit determination of applicability of the gap period.

If it is determined that the gap period is to be applied between the uplink transmissions to different TRPs, a length of the gap period may be considered. The length of the gap period may depend on various factors, such as what the base station expects the UE to do during the gap period, the capability disparity of UEs, requirements on service, and so on.

Figure 10:
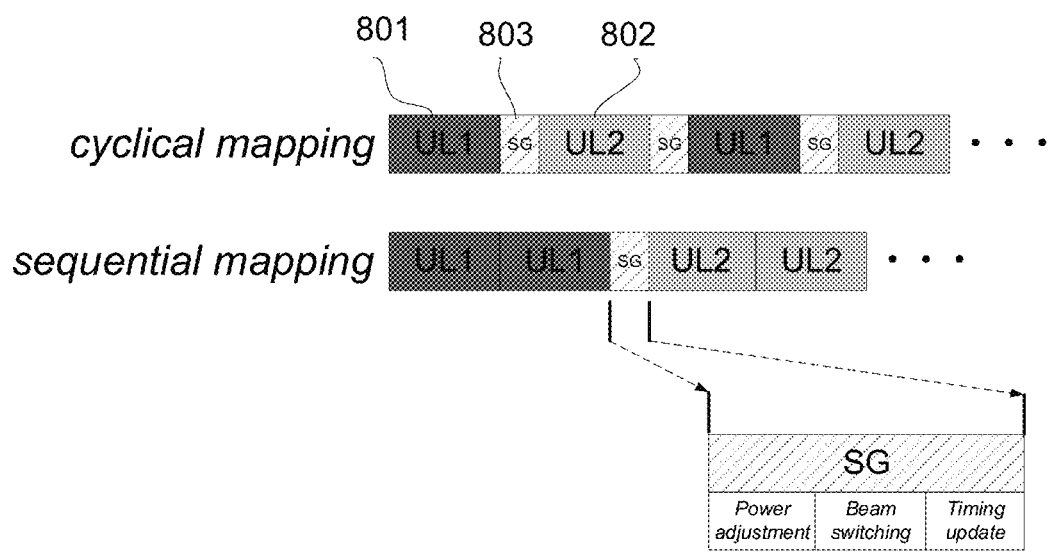
FIG. 10 illustrates exemplary factors affecting a length of gap period, according to some embodiments.

For example, the length of the gap period may be determined by taking into account time for transmit preparations on the UE side, including but not limited to time for uplink transmit power adjustment $T_{power\_transition}$, time for uplink transmit beam switching $T_{beam\_switching}$, and time for uplink transmit timing update $T_{timing\_update}$ on the UE side, as shown in FIG. 10.

$T_{power-transition}$ may vary depending on the supported transmission numerology as described in above Table 1. For example, for subcarrier spacing (SCS) of 15 KHz and 30 KHz, the uplink transmit power adjustment may take $T_{power-transition} \leq 10$ μs, while for SCS of 60 KHz and 120 KHz, the uplink transmit power adjustment may take $T_{power-transition} \leq 5$ μs.

$T_{beam\_switching}$ may depend on several aspects. Assuming that the uplink transmit beam for succeeding uplink transmission is indicated by its quasi co-location (QCL) relationship with a downlink reference signal such as CSI-RS or SSB, or with an uplink reference signal such as SRS. In this case, the UE can form the uplink transmit beam on corresponding antenna panel by using beamforming parameters for receiving the indicated downlink reference signal or for transmitting the indicated uplink reference signal. On the one hand, if the uplink transmit beam for preceding uplink transmission and the uplink transmit beam for succeeding uplink transmission are the same, or are formed on the same panel, then the UE is expected to finish the beam switching within a short time period X1. X1 is generally shorter than a cyclic prefix, for example, it may be 500 ns, 700 ns, 1 μs, 1.5 μs, 2 μs or the like, depending on the subcarrier space (SCS). On the other hand, if the uplink transmit beam for preceding uplink transmission is to be formed on a different panel from the uplink transmit beam for succeeding uplink transmission, as illustrated in FIG. 6, then the UE may need additional time to activate and switch the panel to be used. The whole procedure is expected to be finished within a time period X2, wherein X2 may be equal to or shorter than 1 symbol, for example, it may be 8-9 μs, 60-70 μs or the like, depending on the SCS.

Otherwise, if the associated downlink or uplink reference signal is not indicated for the succeeding uplink transmission, the uplink transmit beam is unknown. In this case, the UE may need to perform beam scanning to track the associated reference signal. The beam scanning may take a relatively long time which actually depends on L1-RSRP measurement period, and thus the gap period preferably does not define requirement for such case. Once the uplink transmit beam is known, $T_{beam\_switching}$ may be estimated as described above.

$T_{timing\_update}$ may also depends on several aspects. For example, if the same uplink timing is configured for uplink transmissions to different TRPs, that is, a uniform frame timing is used, $T_{timing\_update}=0$. Otherwise, $T_{timing\_update}$ may be estimated based on timing reference and/or time advance (TA). Similarly to the estimation of $T_{beam\_switching}$, if the associated downlink or uplink reference signal is known, $T_{timing\_update}=X3$ may be set so as to be synchronized to the uplink timing, wherein X3 may be for example one or more symbols, such as 1 symbol, 2 symbols, 3 symbols or the like, or may be for example 100 μs, 200 μs or the like. If the associated downlink or uplink reference signal is unknown, the UE may need to perform beam scanning to track the associated reference signal, and thus the gap period preferably does not define requirement for such case.

At least based on $T_{power\_transition}$, $T_{beam\_switching}$ and $T_{timing\_update}$, the length of the gap period may be determined. In one example, the length of the gap period may be statistically determined and provided in the specification for 5G NR, such that it may be pre-configured on the UE side and on the base station side. It is also contemplated that the gap period may take more than one constant value for adapting to different situations. The uniform length of the gap period brings convenience in provisioning, but may not adapted to UEs with various capability.

In another example, considering capability disparity of various UEs, the UE may determine the length of the gap period based on its own condition. For example, UE with low capability may perform the power adjustment, the beam switching and the timing update in a sequential manner, and thus the length of the gap period may be determined as $T_{SG}=T_{power\_transition}+T_{beam\_switching}+T_{timing\_update}$. UE with high capability may perform the power adjustment, the beam switching and the timing update in a parallel manner, and thus the length of the gap period may be determined as $T_{SG}=\max \{T_{power\_transition}+T_{beam\_switching}+T_{timing\_update}\}$. The determined length may be signaled to the base station through RRC signaling, for example, as UE capability information included in a UE capability report.

It should be noted that the length of the gap period is a tradeoff between performance and efficiency of the uplink transmissions. Specifically, if the gap period is set to be too long, much time will be wasted on the gap period and the uplink throughput is decreased, and if the gap period is set to be too short, the UE may not finish the preparations for the succeeding transmission, and the performance is degraded. Therefore, the length of the gap period is preferably determined with a more considerate and reasonable algorithm.

Generally, the gap period may start at the end of the preceding uplink transmission and end at the start of the succeeding uplink transmission. That is, in the example of FIG. 9, the gap period 803 may start at the end of the final symbol of UL1 801, and ends at the start of the first symbol of UL2 802.

Figure 11:
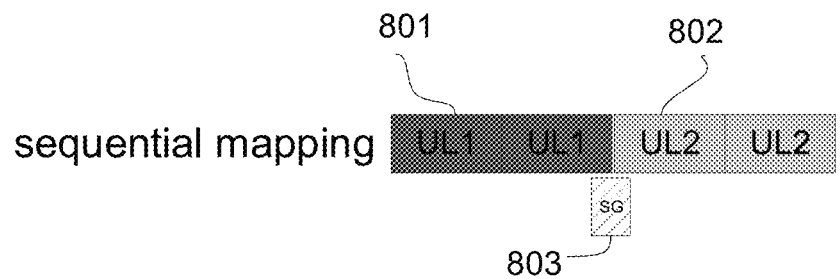
FIG. 11 illustrates a special arrangement of gap period, according to some embodiments.

However, the gap period 803 may be arranged specially in a case where only uplink transmit power adjustment is needed. For instance, if the uplink transmission UL1 801 and the uplink transmission UL2 802 can use the same transmit beam and substantially the same uplink timing, then as illustrated in FIG. 11, the gap period may overlay with either or both of the uplink transmission UL1 801 and UL2 802, that is, the UE may start the power adjustment before the end of the uplink transmission UL1 801 and/or end the power adjustment after the start of the uplink transmission UL2 802. During this time period, the transmit power may gradually transition from the transmit power for UL1 to the transmit power for UL2 while the uplink transmissions UL1 and/or UL2 are still in progress. Such arrangement of the gap period 803 may increase the transmission efficiency while the transmission performance is not degraded too much.

The application of the gap period may impose some impacts in the scheduling of uplink transmission.

As an option, once the gap period is determined to be applied between uplink transmissions to different TRPs, the base station may skip the gap period in uplink scheduling for the UE, so as to avoid potential interference. In other words, no uplink transmission is scheduled within the gap period. This might not necessarily result in a decrease of throughput, since the UE cannot transmit to a different before it finishes all preparations. Out of such consideration, the sequential mapping may be more advantageous than the cyclical mapping, since less gap periods are needed, as shown in FIG. 9.

As another option, the base station may keep scheduling uplink transmission for the UE. In this case, the gap period looks as if it overlaps with the preceding and succeeding uplink transmissions, similarly to the case exemplified in FIG. 11. The uplink performance is expected to be degraded to some extent. If this scheduling option can be used by the base station, some clarifications may be specified in 5G NR to allow the uplink performance degradation.

Communication methods on the UE side and on the base station side are described with reference to FIGS. 12 and 13, according to some embodiments of the present application.

Figure 12:
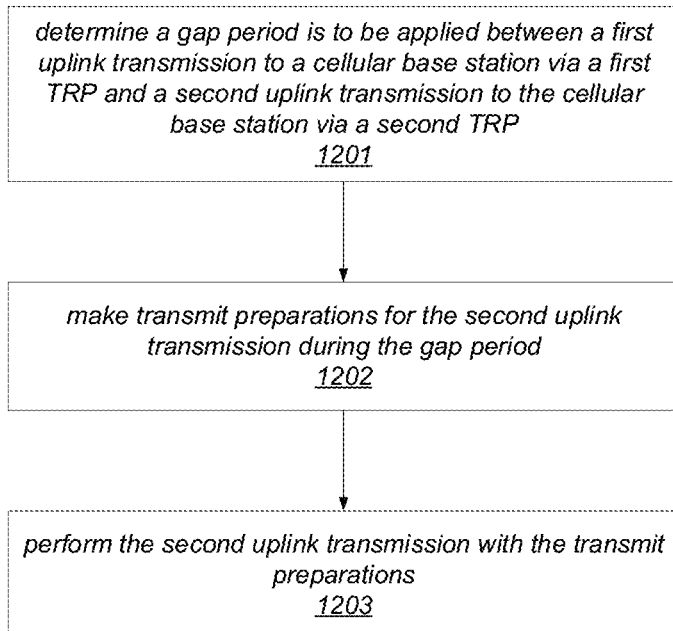
FIG. 12 illustrates a block diagram of an example of a method for multi-TRP uplink transmission performed by a wireless device, according to some embodiments.

FIG. 12 illustrates a block diagram of an example of a method for multi-TRP uplink transmission performed by a wireless device such as UE, according to some embodiments. The method shown in FIG. 12 may be used in conjunction with for example the UE as illustrated in FIG. 3, among other wireless devices. In various embodiments, some of the method elements shown may be performed concurrently, in a different order than shown, or may be omitted. Additional method elements may also be performed as described. As shown, the method may operate as follows.

At 1201, a wireless device, such as UE 106, may determine a gap period is to be applied between a first uplink transmission to a cellular base station via a first TRP and a second uplink transmission to the cellular base station via a second TRP. In some embodiments, the wireless device may determine the applicability of the gap period by testing whether a difference between a transmit power of the first uplink transmission and a transmit power of the second uplink transmission is less than a threshold, whether an uplink transmit timing of the first uplink transmission is the same as an uplink transmit timing of the second uplink transmission, whether a transmit beam for the first uplink transmission is the same as a transmit beam for the second uplink transmission, and so on.

The gap period has a length pre-configured at the wireless device and at the cellular base station. Alternatively, the length of the gap period may be determined by the wireless device at least based on time for uplink transmit power adjustment, time for uplink transmit timing update, and time for uplink transmit beam switching.

At 1202, once it is determined that the gap period is to be applied, the wireless device make transmit preparations for the second uplink transmission during the gap period, including the uplink transmit power adjustment, the uplink transmit timing update, and the uplink transmit beam switching, such that the wireless device is optimized in terms of transmit parameters for the second uplink transmission.

In some embodiments, the gap period starts at the end of the first uplink transmission and ends at the start of the second uplink transmission. In alternative embodiments, the gap period starts before the end of the first uplink transmission and ends after the start of the second uplink transmission.

At 1203, the wireless device may perform the second uplink transmission with the transmit preparations made during the gap period.

Figure 13:
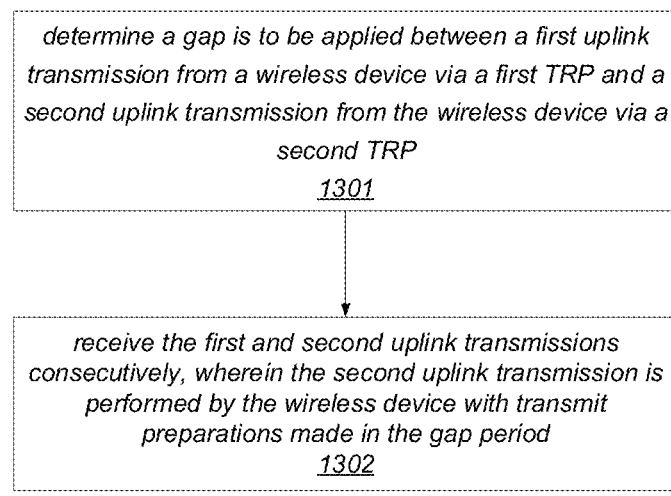
FIG. 13 illustrates a block diagram of an example of a method for multi-TRP uplink transmission performed by a cellular base station, according to some embodiments.

FIG. 13 illustrates a block diagram of an example of a method for multi-TRP uplink transmission performed by a cellular base station, according to some embodiments. The method shown in FIG. 13 may be used in conjunction with for example the BS as illustrated in FIG. 4, among other base stations. In various embodiments, some of the method elements shown may be performed concurrently, in a different order than shown, or may be omitted. Additional method elements may also be performed as described. As shown, the method may operate as follows.

At 1301, the cellular base station may determine a gap is to be applied between a first uplink transmission from a wireless device via a TRP and a second uplink transmission from the wireless device via a second TRP. The cellular base station may determine the applicability of the gap period by a set of tests.

At 1302, once it is determined that the gap period is to be applied, the cellular base station may receive the first and second uplink transmissions consecutively, wherein the second uplink transmission is performed by the wireless device with transmit preparations made in the gap period.

According to the embodiments of the present application, the wireless device and the cellular base station can perform the PUSCH or PUCCH transmissions with repetition with satisfying performance.

In the following further exemplary embodiments are provided.

1). A wireless device, comprising: at least one antenna; at least one radio coupled to the at least one antenna; and a processor coupled to the at least one radio and configured to cause the wireless device to: determine a gap period is to be applied between a first uplink transmission to a cellular base station via a first transmission and reception point (TRP) and a second uplink transmission to the cellular base station via a second TRP; make transmit preparations for the second uplink transmission during the gap period; and perform the second uplink transmission with the transmit preparations.

2). The wireless device of 1), wherein the gap period is determined to be applied unless all of the following conditions are met: a difference between a transmit power of the first uplink transmission and a transmit power of the second uplink transmission is less than a threshold; an uplink transmit timing of the first uplink transmission is the same as an uplink transmit timing of the second uplink transmission; and a transmit beam for the first uplink transmission is the same as a transmit beam for the second uplink transmission.

3). The wireless device of 1), wherein the transmit preparations for the second uplink transmission including at least one of uplink transmit power adjustment, uplink transmit timing update, and uplink transmit beam switching.

4). The wireless device of 1), wherein the gap period has a length pre-configured at the wireless device and at the cellular base station.

5). The wireless device of 1), wherein the processor is further configured to cause the wireless device to determine a length of the gap period at least based on time for uplink transmit power adjustment, time for uplink transmit timing update, and time for uplink transmit beam switching; and signal the determined length of the gap period to the cellular base station as UE capability information.

6). The wireless device of 1), wherein the gap period overlaps with a part of the first uplink transmission and a part of the second uplink transmission.

7). The wireless device of 1), wherein the gap period starts at the end of the first uplink transmission and ends at the start of the second uplink transmission.

8). The wireless device of 7), wherein no uplink transmission is scheduled during the gap period.

9). A cellular base station, comprising: at least one antenna; at least one radio coupled to the at least one antenna; and a processor coupled to the at least one radio and configured to cause the cellular base station to: determine a gap is to be applied between a first uplink transmission from a wireless device via a first transmission and reception point (TRP) and a second uplink transmission from the wireless device via a second TRP; and receive the first and second uplink transmissions consecutively, wherein the second uplink transmission is performed by the wireless device with transmit preparations made in the gap period.

10). The cellular base station of 9), wherein the gap period is determined to be applied unless all of the following conditions are met: a difference between a transmit power of the first uplink transmission and a transmit power of the second uplink transmission is less than a threshold; an uplink transmit timing of the first uplink transmission is the same as an uplink transmit timing of the second uplink transmission; and a transmit beam for the first uplink transmission is the same as a transmit beam for the second uplink transmission.

11). The cellular base station of 9), wherein the transmit preparations for the second uplink transmission including at least one of uplink transmit power adjustment, uplink transmit timing update, and uplink transmit beam switching.

12). The cellular base station of 9), wherein the gap period has a length pre-configured at the wireless device and at the cellular base station.

13). The cellular base station of 9), wherein the processor is further configured to cause the cellular base station to receive, from the wireless device and before the uplink transmissions, a length of the gap period determined at least based on time for uplink transmit power adjustment, time for uplink transmit timing update, and time for uplink transmit beam switching.

14). The cellular base station of 9), wherein the gap period overlaps with a part of the first uplink transmission and a part of the second uplink transmission.

15). The cellular base station of 9), wherein the gap period starts at the end of the first uplink transmission and ends at the start of the second uplink transmission.

16). The cellular base station of 8), wherein the processor is further configured to cause the cellular base station to: schedule no uplink transmission for the wireless device during the gap period.

17). A method for a wireless device, comprising: determining a gap period is to be applied between a first uplink transmission to a cellular base station via a first transmission and reception point (TRP) and a second uplink transmission to the cellular base station via a second TRP; making transmit preparations for the second uplink transmission during the gap period; and performing the second uplink transmission with the transmit preparations.

18). The method of 17), wherein the gap period is determined to be applied unless all of the following conditions are met: a difference between a transmit power of the first uplink transmission and a transmit power of the second uplink transmission is less than a threshold; an uplink transmit timing of the first uplink transmission is the same as an uplink transmit timing of the second uplink transmission; and a transmit beam for the first uplink transmission is the same as a transmit beam for the second uplink transmission.

19). The method of 17), wherein the gap period has a length pre-configured at the wireless device and at the cellular base station.

20). The method of 17), further comprising: determining a length of the gap period at least based on time for uplink transmit power adjustment, time for uplink transmit timing update, and time for uplink transmit beam switching; and signaling the determined length of the gap period to the cellular base station as UE capability information.

21). A method for a cellular base station, comprising: determining a gap is to be applied between a first uplink transmission from a wireless device via a first transmission and reception point (TRP) and a second uplink transmission from the wireless device via a second TRP; and receiving the first and second uplink transmissions consecutively, wherein the second uplink transmission is performed by the wireless device with transmit preparations made in the gap period.

22). The method of 21), wherein the gap period is determined to be applied unless all of the following conditions are met: a difference between a transmit power of the first uplink transmission and a transmit power of the second uplink transmission is less than a threshold; an uplink transmit timing of the first uplink transmission is the same as an uplink transmit timing of the second uplink transmission; and a transmit beam for the first uplink transmission is the same as a transmit beam for the second uplink transmission.

23). The method of 21), wherein the gap period has a length pre-configured at the wireless device and at the cellular base station.

24). The method of 21), further comprising: receiving, from the wireless device, a length of the gap period determined at least based on time for uplink transmit power adjustment, time for uplink transmit timing update, and time for uplink transmit beam switching.

25). An apparatus, comprising: a processor configured to cause a wireless device to: determine a gap period is to be applied between a first uplink transmission to a cellular base station via a first transmission and reception point (TRP) and a second uplink transmission to the cellular base station via a second TRP; and make transmit preparations for the second uplink transmission during the gap period; and perform the second uplink transmission with the transmit preparations.

26). An apparatus, comprising: a processor configured to cause a cellular base station to: determine a gap is to be applied between a first uplink transmission from a wireless device via a first transmission and reception point (TRP) and a second uplink transmission from the wireless device via a second TRP; and receive the first and second uplink transmissions consecutively, wherein the second uplink transmission is performed by the wireless device with transmit preparations made in the gap period.

27). A non-transitory computer-readable memory medium storing program instructions which, when executed at a device, cause the device to perform the method of any of 17-20) or 21-24).

28). A computer program product, comprising program instructions which, when executed at a device, cause the device to perform the method of any of 17-20) or 21-24).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna;
   at least one radio coupled to the at least one antenna; and
   a processor coupled to the at least one radio and configured to:
      determine an applicability of a gap period to be applied between a first uplink transmission to a cellular base station via a first transmission and reception point (TRP) and a second uplink transmission to the cellular base station via a second TRP, wherein the gap period is determined to be applied unless all of the following conditions are met:
         a difference between a transmit power of the first uplink transmission and a transmit power of the second uplink transmission is less than a threshold;
         an uplink transmit timing of the first uplink transmission is the same as an uplink transmit timing of the second uplink transmission; and
         a transmit beam for the first uplink transmission is the same as a transmit beam for the second uplink transmission;
      make transmit preparations for the second uplink transmission during the gap period; and
      perform the second uplink transmission with the transmit preparations.

2. The wireless device of claim 1, wherein the transmit preparations for the second uplink transmission comprise at least one of uplink transmit power adjustment, uplink transmit timing update, and uplink transmit beam switching.

3. The wireless device of claim 1, wherein the gap period has a length pre-configured at the wireless device and at the cellular base station.

4. The wireless device of claim 1, wherein the processor is further configured to:
   determine a length of the gap period at least based on time for uplink transmit power adjustment, time for uplink transmit timing update, and time for uplink transmit beam switching; and
   signal the determined length of the gap period to the cellular base station as user equipment (UE) capability information.

5. The wireless device of claim 1, wherein the gap period overlaps with a part of the first uplink transmission and a part of the second uplink transmission.

6. The wireless device of claim 1, wherein the gap period starts at an end of the first uplink transmission and ends at a start of the second uplink transmission.

7. The wireless device of claim 6, wherein no uplink transmission is scheduled during the gap period.

8. A cellular base station, comprising:
   at least one antenna;
   at least one radio coupled to the at least one antenna; and
   a processor coupled to the at least one radio and configured to:
      determine an applicability of a gap period to be applied between a first uplink transmission from a wireless device via a first transmission and reception point (TRP) and a second uplink transmission from the wireless device via a second TRP, wherein the gap period is determined to be applied unless all of the following conditions are met:
         a difference between a transmit power of the first uplink transmission and a transmit power of the second uplink transmission is less than a threshold;
         an uplink transmit timing of the first uplink transmission is the same as an uplink transmit timing of the second uplink transmission; and
         a transmit beam for the first uplink transmission is the same as a transmit beam for the second uplink transmission; and
      receive the first and second uplink transmissions consecutively, wherein the second uplink transmission is performed by the wireless device with transmit preparations made in the gap period.

9. The cellular base station of claim 8, wherein the transmit preparations for the second uplink transmission comprise at least one of uplink transmit power adjustment, uplink transmit timing update, and uplink transmit beam switching.

10. The cellular base station of claim 8, wherein the gap period has a length pre-configured at the wireless device and at the cellular base station.

11. The cellular base station of claim 8, wherein the processor is further configured to:
receive, from the wireless device and before the first and second uplink transmissions, a length of the gap period determined at least based on time for uplink transmit power adjustment, time for uplink transmit timing update, and time for uplink transmit beam switching.

12. The cellular base station of claim 8, wherein the gap period overlaps with a part of the first uplink transmission and a part of the second uplink transmission.

13. The cellular base station of claim 8, wherein the gap period starts at an end of the first uplink transmission and ends at a start of the second uplink transmission.

14. The cellular base station of claim 8, wherein the processor is further configured to:
schedule no uplink transmission for the wireless device during the gap period.

15. A method for a wireless device, comprising:
determining an applicability of a gap period to be applied between a first uplink transmission to a cellular base station via a first transmission and reception point (TRP) and a second uplink transmission to the cellular base station via a second TRP, wherein the gap period is determined to be applied unless all of the following conditions are met:
a difference between a transmit power of the first uplink transmission and a transmit power of the second uplink transmission is less than a threshold;
an uplink transmit timing of the first uplink transmission is the same as an uplink transmit timing of the second uplink transmission; and
a transmit beam for the first uplink transmission is the same as a transmit beam for the second uplink transmission;
making transmit preparations for the second uplink transmission during the gap period; and
performing the second uplink transmission with the transmit preparations.

16. The method of claim 15, wherein the gap period has a length pre-configured at the wireless device and at the cellular base station.

17. The method of claim 15, further comprising:
determining a length of the gap period at least based on time for uplink transmit power adjustment, time for uplink transmit timing update, and time for uplink transmit beam switching; and
signaling the determined length of the gap period to the cellular base station as user equipment (UE) capability information.

18. The method of claim 15, wherein the transmit preparations for the second uplink transmission comprise at least one of an uplink transmit power adjustment, an uplink transmit timing update, and uplink transmit beam switching.

19. The method of claim 15, wherein the gap period overlaps with a part of the first uplink transmission and a part of the second uplink transmission.

20. The method of claim 15, wherein the gap period starts at an end of the first uplink transmission and ends at a start of the second uplink transmission and wherein no uplink transmission is scheduled during the gap period.

* * * * *